(12) United States Patent
Ishikawa et al.

(10) Patent No.: US 8,238,599 B2
(45) Date of Patent: Aug. 7, 2012

(54) IMAGE PROCESSING DEVICE AND IMAGE PROCESSING METHOD FOR IDENTIFYING A SELECTED ONE OR MORE EMBEDDING METHODS USED FOR EMBEDDING TARGET INFORMATION

(75) Inventors: Masaaki Ishikawa, Tokyo (JP); Takashi Saitoh, Tokyo (JP); Hiroshi Shimura, Kanagawa (JP); Haike Guan, Kanagawa (JP); Taeko Ishizu, Saitama (JP); Hideaki Yamagata, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1270 days.

(21) Appl. No.: 12/000,642

(22) Filed: Dec. 14, 2007

(65) Prior Publication Data
US 2008/0166013 A1    Jul. 10, 2008

(30) Foreign Application Priority Data

Dec. 15, 2006 (JP) .................................. 2006-338559
Oct. 5, 2007 (JP) .................................. 2007-262266

(51) Int. Cl.
| G06K 9/00 | (2006.01) |
| G06K 9/18 | (2006.01) |
| G06K 9/46 | (2006.01) |
| G06K 9/36 | (2006.01) |
| G06K 9/60 | (2006.01) |

(52) U.S. Cl. ........ 382/100; 382/181; 382/182; 382/183; 382/190; 382/192; 382/193; 382/194; 382/232; 382/191; 382/306

(58) Field of Classification Search ........................ None
See application file for complete search history.

(56) References Cited

U.S. PATENT DOCUMENTS

| 6,901,236 B2 | 5/2005 | Saitoh et al. |
| 6,922,777 B1 | 7/2005 | Iwamura |
| 7,062,067 B2 * | 6/2006 | Braudaway et al. .......... 382/100 |
| 7,321,665 B2 * | 1/2008 | Oh ................................ 382/100 |
| 7,404,083 B2 * | 7/2008 | Takahashi ..................... 713/176 |

(Continued)

FOREIGN PATENT DOCUMENTS

JP          06-125459          5/1994

(Continued)

OTHER PUBLICATIONS

T. Amano et al. "A method for embedding digital watermarks in page descriptions." Information Processing Society of Japan (IMPS) SIG Technical Report, vol. 98, No. 84, Sep. 17, 1998, pp. 45-50, and English translation thereof.

(Continued)

*Primary Examiner* — Tom Y Lu
*Assistant Examiner* — Thomas Conway
(74) *Attorney, Agent, or Firm* — Harness, Dickey & Pierce, P.L.C.

(57) ABSTRACT

An image processing method is disclosed that is capable of efficient information extraction when embedding information in an image by using plural information embedding methods. The image processing method includes steps of embedding target information in the image by using one or more methods selected from plural information embedding methods; and embedding identification information in the image for identifying the selected one or more methods. The identification information is embedded in a method allowing an amount of the embedded information to be less than an amount of the embedded information in each of the selected one or more methods.

6 Claims, 16 Drawing Sheets

U.S. PATENT DOCUMENTS

| | | | |
|---|---|---|---|
| 7,609,851 B2 * | 10/2009 | Guan et al. | 382/100 |
| 2004/0090646 A1 | 5/2004 | Saitoh et al. | |
| 2004/0184065 A1 | 9/2004 | Guan et al. | |
| 2005/0041263 A1 | 2/2005 | Ishikawa et al. | |
| 2005/0052682 A1 | 3/2005 | Ishikawa et al. | |
| 2005/0078331 A1 | 4/2005 | Guan et al. | |
| 2005/0151989 A1 | 7/2005 | Shimura et al. | |
| 2005/0151990 A1 | 7/2005 | Ishikawa et al. | |
| 2006/0126098 A1 | 6/2006 | Shimura et al. | |
| 2006/0164693 A1 | 7/2006 | Matsumoto et al. | |
| 2006/0236112 A1 * | 10/2006 | Maeno | 713/176 |
| 2006/0256362 A1 | 11/2006 | Guan et al. | |
| 2006/0279792 A1 | 12/2006 | Ishizu et al. | |
| 2007/0003341 A1 | 1/2007 | Guan et al. | |
| 2007/0297644 A1 | 12/2007 | Ishikawa et al. | |
| 2011/0194726 A1 * | 8/2011 | Das Gupta et al. | 382/100 |

FOREIGN PATENT DOCUMENTS

| | | |
|---|---|---|
| JP | 07-036317 | 2/1995 |
| JP | 07-087309 | 3/1995 |
| JP | 11-027518 | 1/1999 |
| JP | 11-041445 | 2/1999 |
| JP | 2000-287067 | 10/2000 |
| JP | 2001-086330 | 3/2001 |
| JP | 2002-354231 | 12/2002 |
| JP | 2002-354232 | 12/2002 |
| JP | 2002-359737 | 12/2002 |
| JP | 2004-274092 | 9/2004 |
| JP | 2006-274092 | 9/2004 |
| JP | 2005-057797 | 3/2005 |
| JP | 2006-229924 | 8/2006 |
| JP | 2006-287902 | 10/2006 |
| JP | 2006-325219 | 11/2006 |

OTHER PUBLICATIONS

H. Tulia et al. "Digital watermarks in lettering images by using character shape." The Transactions of the Institute of Electronics, Information and Communication Engineers. D-II, vol. J82-D-II, No. 11, Nov. 25, 1999, pp. 2175-2177, and English translation thereof.

* cited by examiner

FIG.5

| EMBEDDING METHOD IDENTIFICATION INFORMATION | RELATIVE ANGLE: 22.5 × n (n:1~8) |
|---|---|
| 000 | 22.5 ×1 |
| 001 | 22.5 ×2 |
| 010 | 22.5 ×3 |
| 011 | 22.5 ×4 |
| 100 | 22.5 ×5 |
| 101 | 22.5 ×6 |
| 110 | 22.5 ×7 |
| 111 | 22.5 ×8 |

FIG.7

| TARGET EMBEDDING INFORMATION | ARRANGEMENT OF 0, 0, 1, 1 (LEFT TOP, RIGHT TOP, LEFT BOTTOM, RIGHT BOTTOM) |
|---|---|
| 0 | 0011 |
| 1 | 0101 |
| 2 | 0110 |
| 3 | 1001 |
| 4 | 1010 |
| 5 | 1100 |

FIG.10

| EMBEDDING STATES OF THE TARGET EMBEDDING INFORMATION | 1ST NON-REAL-TIME METHOD | 2ND NON-REAL-TIME METHOD | 3RD NON-REAL-TIME METHOD |
|---|---|---|---|
| 000 | NO | NO | NO |
| 100 | YES | NO | NO |
| 010 | NO | YES | NO |
| 001 | NO | NO | YES |
| 110 | YES | YES | NO |
| 101 | YES | NO | YES |
| 011 | NO | YES | YES |
| 111 | YES | YES | YES |

IMAGE PROCESSING DEVICE AND IMAGE PROCESSING METHOD FOR IDENTIFYING A SELECTED ONE OR MORE EMBEDDING METHODS USED FOR EMBEDDING TARGET INFORMATION

BACKGROUND OF THE INVENTION

1. Field of the Invention

The present invention relates to an image processing device and an image processing method, and particularly, to an image processing device and an image processing method able to embed information into or extract information from an image.

2. Description of the Related Art

In recent years, along with improvement of image processing techniques and image forming techniques, one can even faithfully duplicate notes (paper money) or securities with a digital color copier with little difference between the duplicated ones and the original ones. For this reason, for special documents like the notes or the securities, it is necessary to take measures to prevent such special documents from being illegally duplicated or from being correctly duplicated.

Additionally, for example, in a company, instead of the special documents like the notes or the securities, even for general documents, since there are many confidential documents, it is necessary to control duplication of such confidential documents from the point of view of confidentiality. That is, it is necessary to take measures to prevent such confidential documents from being illegally duplicated or from being correctly duplicated.

Due to this, in the related art, many studies have been made regarding restricting duplication of the special documents and confidential documents. For example, Japanese Laid Open Patent Application No. 2004-274092 (hereinafter, referred to as "reference 1") discloses a technique in which output is prevented if a predetermined dot pattern is detected from an image read by a scanner. Therefore, if the predetermined dot pattern is embedded in a special document or a confidential document, duplication of which is not allowed, it is possible to effectively prevent the document from being reproduced.

Although the technique disclosed in reference 1 is able to effectively prevent a confidential document from being illegally duplicated, this technique can deal with only a small amount of the information embedded in a special document, specifically, only one bit indicating whether the target document is a confidential document. However, in order to realize information security functions of high flexibility, for example, the embedded information is combined with user authentication, and duplication permission is switched depending on the position of the user, so that it is necessary that the embedded information be of at least a few bits.

In addition to preventing output during duplication, when using a copier without the function of detecting the output prevention data, like the dot pattern, when a copy of the document obtained with the copier outflows, it is also required to embed tracking information into the document to determine from where the copy outflows. In this case, it is desired that the amount of the embedded information be about 100 bits or more.

To attain these objects, the inventors of the current invention proposed an information embedding method involving background dot patterns and enabling extraction of about 100 bits of embedded information. For example, this technique is disclosed in Japanese Laid Open Patent Application No. 2006-287902 (hereinafter, referred to as "reference 2").

There are many other methods enabling extraction of about 100 bits of embedded information, and these methods have advantages and disadvantages. For example, in the method utilizing a background dot pattern, since the dot pattern is repeatedly embedded in the background of the document, the dot pattern more or less influences reading of the document, but this method has good hiding properties, in other words, the dot pattern cannot be hidden easily during duplication.

On the other hand, methods involving embedding of a code image in a specified region, like a common bar code and a two-dimensional bar code, have good versatility, but can be easily hidden during duplication when used for preventing un-authorized duplication.

Further, when text images are used, by changing character intervals or changing the character shape, it is possible to embed information with the embedded information being hardly perceivable by human beings.

For example, T. Amano and Y. Hirayama, "A method for embedding digital watermarks in page descriptions", Information Processing Society of Japan (IMPS) SIG Technical Report, Vol. 98, No. 84, Sep. 17, 1998, pp 45-50 (hereinafter, referred to as "reference 3") discloses the method of changing character intervals to embed information.

H. Tulia and M. Mesuji, "Digital watermarks in lettering Images by Using Character Shape", The Transactions of the Institute of Electronics, Information and Communication Engineers. D-II, Vol. J82-D-II, No. 11, Nov. 25, 1999, pp 2175-2177 (hereinafter, referred to as "reference 4") discloses the method of changing the character shape to embed information.

Therefore, it is desirable that depending on applications, one or more information embedding methods be appropriately selected among plural kinds of information embedding methods to embed information, thus improving convenience.

However, if it is allowed to arbitrarily select a method of embedding multi-bit information from plural information embedding methods, when extracting the embedded information, it is impossible to determine by which method the information is embedded. Thus, it is necessary to try extraction of the embedded information with all possible information embedding methods, and this degrades performance of information extraction.

In addition, the information extraction process is performed even for general documents in which multi-bit information is not embedded, and this degrades performance of the duplication process for the general documents which do not need duplication control.

Generally, when the amount of information embedded in a specified area of a document increases, extraction of the embedded information requires a memory of a large capacity and a great deal of processing. Due to this, when making copies with a copier, it is difficult to extract information embedded by a multi-bit information embedding method in real time, that is, scanning an image with a line sensor in units of lines, while performing the information extraction processing in parallel. Therefore, in order to extract multi-bit information when making copies, it is required that the output process be stopped before the whole image, or an amount of image information sufficient for information extraction, is loaded in a frame memory, and this causes non-negligible degradation of the performance of the above duplication process.

SUMMARY OF THE INVENTION

The present invention may solve one or more problems of the related art.

A preferred embodiment of the present invention may provide an image processing method and an image processing device capable of efficient information extraction when embedding information in an image by using plural information embedding methods.

According to a first aspect of the present invention, there is provided an image processing device for embedding information into an image, comprising:

an information embedding unit configured to embed target information in the image by using one or more methods selected from a plurality of information embedding methods; and an identification information embedding unit configured to embed identification information in the image for identifying the selected one or more methods, wherein the identification information embedding unit embeds the identification information in a method allowing an amount of the embedded information to be less than an amount of the embedded information in each of the selected one or more methods.

According to a second aspect of the present invention, there is provided an image processing device for extracting information from an image in which the image processing device embedded information by using one or more information embedding methods, said device comprising:

an identification information extracting unit configured to extract identification information for identifying the one or more information embedding methods used for embedding the information in the image; and an information extracting unit configured to extract the information embedded in the image by using the one or more methods identified by the identification information;

wherein the identification information is embedded in a method allowing an amount of the embedded information to be less than an amount of the embedded information in each of the one or more methods.

According to a third aspect of the present invention, there is provided an image processing method for an image processing device to embed information into an image, said image processing method comprising:

an information embedding step of embedding target information in the image by using one or more methods selected from a plurality of information embedding methods; and an identification information embedding step of embedding identification information in the image for identifying the selected one or more methods, wherein in the identification information embedding step, the identification information is embedded in a method allowing an amount of the embedded information to be less than an amount of the embedded information in each of the selected one or more methods.

According to the embodiments of the present invention, it is possible to efficiently extract information even when the information is embedded in the image by using plural information embedding methods.

These and other objects, features, and advantages of the present invention will become more apparent from the following detailed description of preferred embodiments given with reference to the accompanying drawings.

BRIEF DESCRIPTION OF THE DRAWINGS

FIG. 5 is a table exemplifying a relationship between the relative angle and the embedding method identification information;

FIG. 7 is a table exemplifying the relationship between the arrangement and the target embedding information;

FIG. 10 is a table exemplifying a relationship between the embedding states of the target embedding information and the embedding method identification information;

DESCRIPTION OF THE PREFERRED EMBODIMENTS

Figure 1:
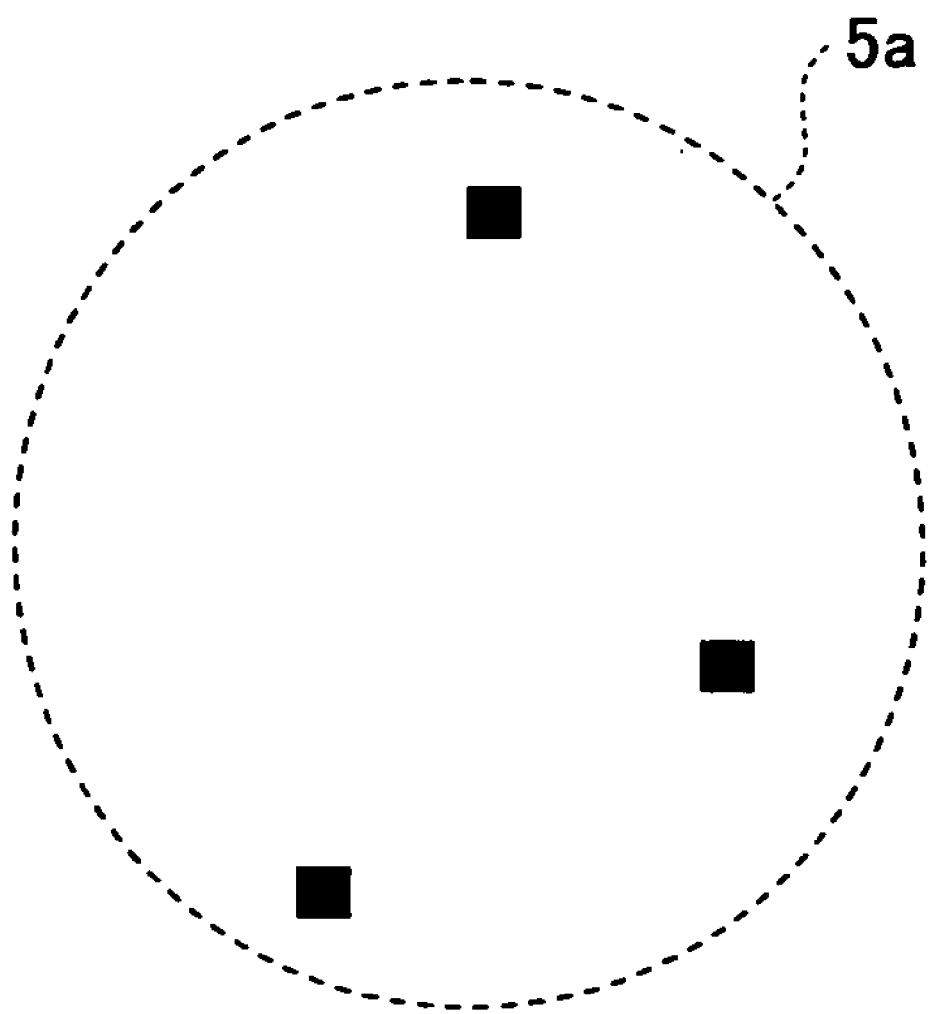
FIG. 1 is a diagram exemplifying a dot pattern used in the present embodiment of the present invention.

Below, preferred embodiments of the present invention are explained with reference to the accompanying drawings.

In the following embodiments, it is assumed that information for security or other purposes is embedded in an image by using three information embedding methods. Here, by "image", it means an image recorded (printed) on a medium (for example, paper or others), or electronic data which are electronically recorded in a recording medium; generally, any kind of information, regardless of the form, perceivable by visual senses of human beings, or data representing the information.

Below, the information for security or other purposes embedded in the image is referred to as "target embedding information" where necessary.

In the following embodiments, the state of an image is roughly classified into four categories as below.

(1) The target embedding information is embedded by using any one of the three information embedding methods.

(2) The target embedding information is embedded by using any two of the three information embedding methods.

(3) The target embedding information is embedded by using all of the three information embedding methods.

(4) None of the three information embedding methods is used to embed the target embedding information.

In the present embodiment, in addition to the target embedding information, another piece of information is also embedded in the image for identifying which state the image is in, in other words, which of the three methods is used for embedding the target embedding information. The information for identifying the state of the image is referred to as "embedding method identification information" below.

When extracting the target embedding information embedded in an image by one or more of the three information embedding methods, first, the embedding method identification information is extracted to determine which of the states (1) through (4) the image is in. Next, the target embedding information is extracted by an appropriate method corresponding to the determined state. Therefore, for images in the states (1), (2), and (4), excessive operations can be reduced compared to images in the state (3), and this enables efficient extraction of the target embedding information.

In the present embodiment, the three information embedding methods are able to embed information of a few tens bits to a few hundreds bits. With such kinds of methods, usually, it is necessary to extract the target embedding information in a non-real-time manner. For example, when duplicating a document on which an image with embedded information is printed, an output process of an image processing device has to be stopped until the whole image, or an amount of image information sufficient for information extraction, is loaded in a frame memory. In the following, an information embedding method requiring a non-real-time information extraction is referred to as "non-real-time information embedding method". Usually, the information embedding methods able to embed information of a few tens bits to a few hundreds bits correspond to the non-real-time information embedding method.

The three information embedding methods mentioned above also correspond to the non-real-time information embedding method. It should be noted that in the present embodiment, the three information embedding methods are mentioned just for illustration, and the present embodiment is not limited to these methods. The present embodiment is applicable to other information embedding methods, that is, the present embodiment is applicable even when the target embedding information is embedded by other methods. In addition, the present embodiment is applicable even when the target embedding information is embedded by two, or four, or more methods. Further, when the target embedding information is embedded by plural methods at the same time, namely, the image is in the state (2) or state (3), the target embedding information embedded by different methods can be the same information, or different information.

Concerning the method of embedding the embedding method identification information, in order to identify the state of the image, that is, the methods used for embedding the target embedding information, it is sufficient to embed information of only a few bits. There exists a certain relationship between the available amount (available number of bits) of the embedded information and the performance of extraction of the embedded information. Specifically, when the available amount of the embedded information is small, extraction of the embedded information is simple, and non-real-time information embedding becomes unnecessary; in other words, scanning an image with a line sensor in units of lines and information extraction can be performed in parallel. Due to this, in the present embodiment, the embedding method identification information is embedded following a method in which the amount of embedded information is less than the amount of embedded information in each of the three information embedding methods mentioned above. In other words, the embedding method identification information is embedded following a method which does not require non-real-time processing. In the following, an information embedding method not requiring a non-real-time information extraction is referred to as "real-time information embedding method".

Therefore, in the present embodiment, plural non-real-time information embedding methods are used to embed the target embedding information, and the information for identifying which method is used for embedding the target embedding information, namely, the embedding method identification information, is embedded so that the available amount of embedded information is less than the available amount of embedded information in each of the non-real-time information embedding methods. Due to this, it is possible to efficiently extract information.

Below, preferred embodiments of the present invention are explained with reference to the accompanying drawings. First, the method of embedding the embedding method identification information is described. In the present embodiment, for example, the embedding method identification information is embedded into an image by combining (superposing) a pattern including plural dots (below, referred to as "dot pattern") on the background of the image.

For example, the following dot patterns can be used.

FIG. 1 is a diagram exemplifying a dot pattern used in the present embodiment of the present invention.

As shown in FIG. 1, a dot pattern 5a includes three dots, and the relative positional relationships between every two of the three dots are defined. Certainly, in the present embodiment, the number of the dots constituting a dot pattern can be greater than three. Further, it is not necessary that the pattern be a dot pattern. For example, the pattern can be formed by line segments or a combination of line segments and dots.

Figure 2:
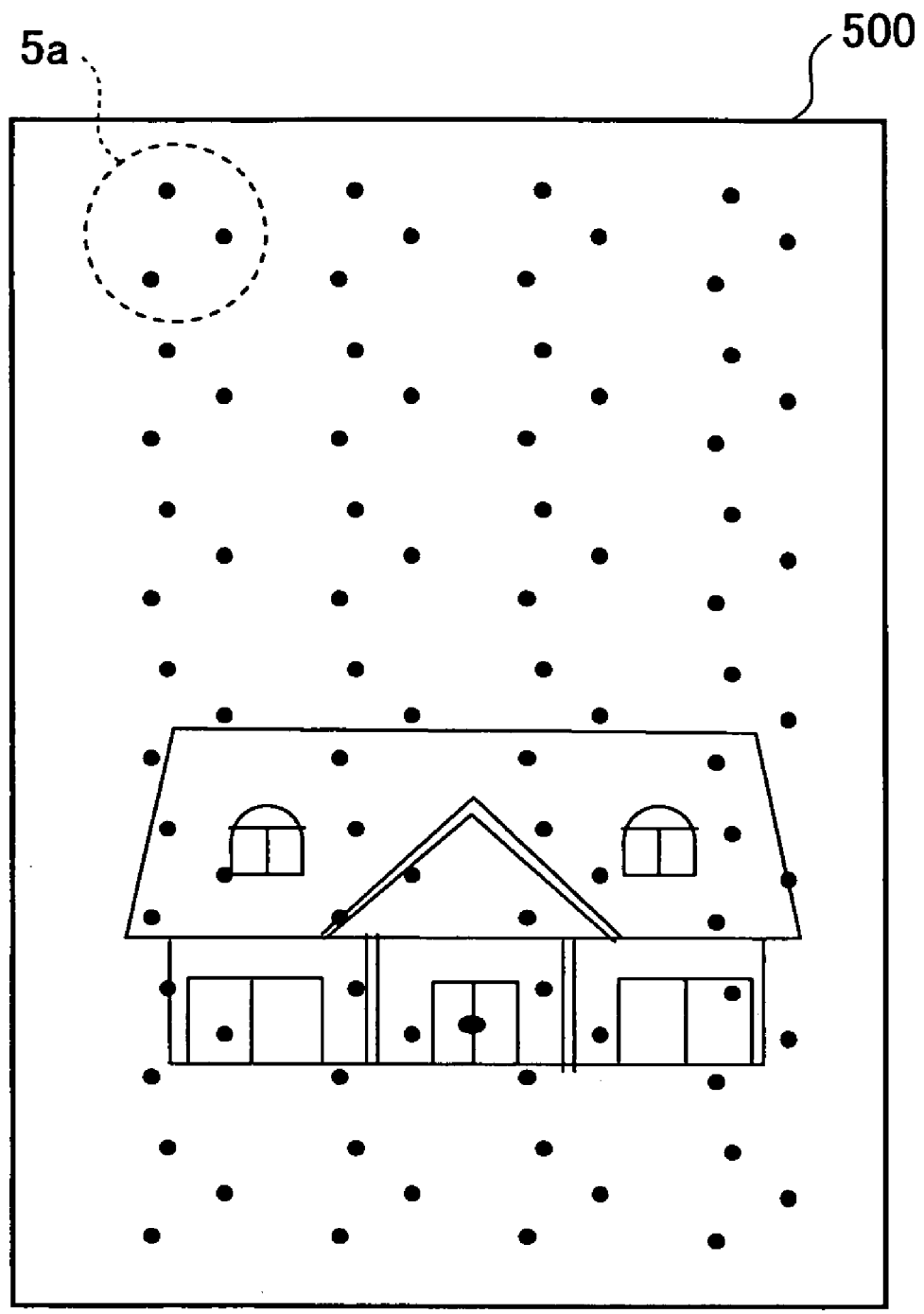
FIG. 2 is a diagram exemplifying an image on which a dot pattern is combined.

FIG. 2 is a diagram exemplifying an image on which a dot pattern is combined.

In FIG. 2, the dot pattern 5a shown in FIG. 1 is repeatedly superposed on the background of an image 500.

It should be noted that in FIG. 2, the dot pattern 5a is enlarged for purpose of illustration; actually, the dot pattern 5a is tiny.

By superposing the dot pattern on the background of the image 500, at least one-bit information can be embedded in the image 500. Specifically, the one-bit information indicates the case in which the dot pattern 5a is combined, and the case in which the dot pattern 5a is not combined.

However, in order to identify the above four states (1) through (4), it is certain that one bit is not sufficient. Specifically, the state (1) further includes three sub-states corresponding to the three information embedding methods. Similarly, the state (2) further includes three sub-states corresponding to three combinations of every two of the three information embedding methods. Thus, there are in total eight states, and the embedding method identification information should have a number of bits sufficient for identifying the eight states. Therefore, the embedding method identification information should have at least three bits.

For this purpose, in the present embodiment, the angular difference between two dot patterns 5a is used to represent certain information. Specifically, a relative angular difference between a dot pattern 5a or a pattern obtained by rotating the dot pattern 5a by an arbitrary angle (below, referred to as "basic pattern"), and a dot pattern obtained by rotating the basic pattern by a certain angle (below, referred to as "additional pattern") is used to represent the embedding method identification information.

Here, the rotational center of rotating the dot patterns 5a is not limited to a specific position, but it is necessary to maintain this rotational center to be coincident with the rotational center defined in information extraction.

Figure 17:
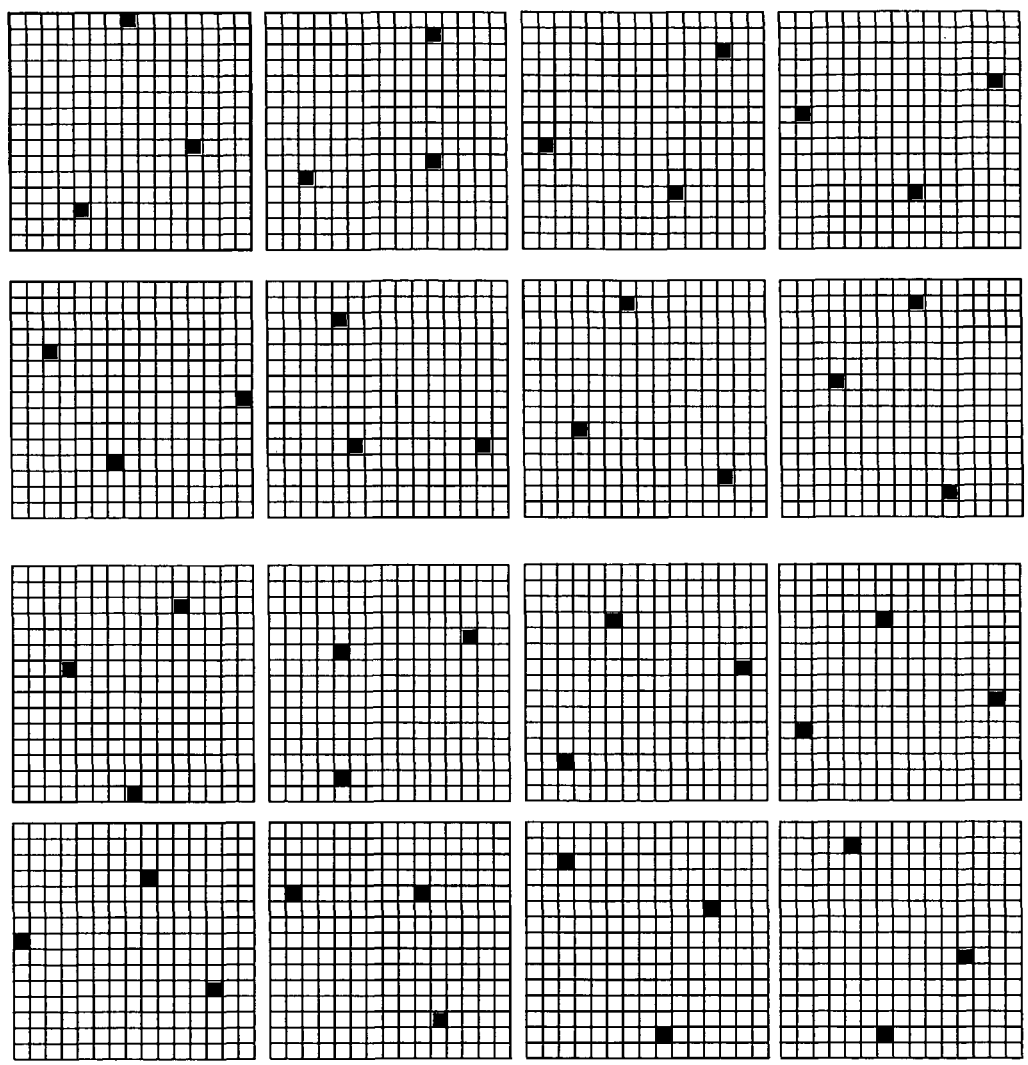
FIG. 17 is schematic view exemplifying a pattern dictionary.

In the present embodiment, a pattern dictionary as described below with reference to FIG. 17 is used for information extraction. In the pattern dictionary as shown in FIG. 17, in a rectangular region including the dot pattern 5a, a pixel at the center coordinates of the rectangular region is used as a rotational center. For example, when the rectangular region has a width of W and a height of H, a pixel used as a rotational center is at a position of coordinates (W/2, H/2). Thus, the rotational center of rotating the dot patterns 5a is also the pixel at the center coordinates of the rectangular region including the dot pattern 5a.

Figure 3:
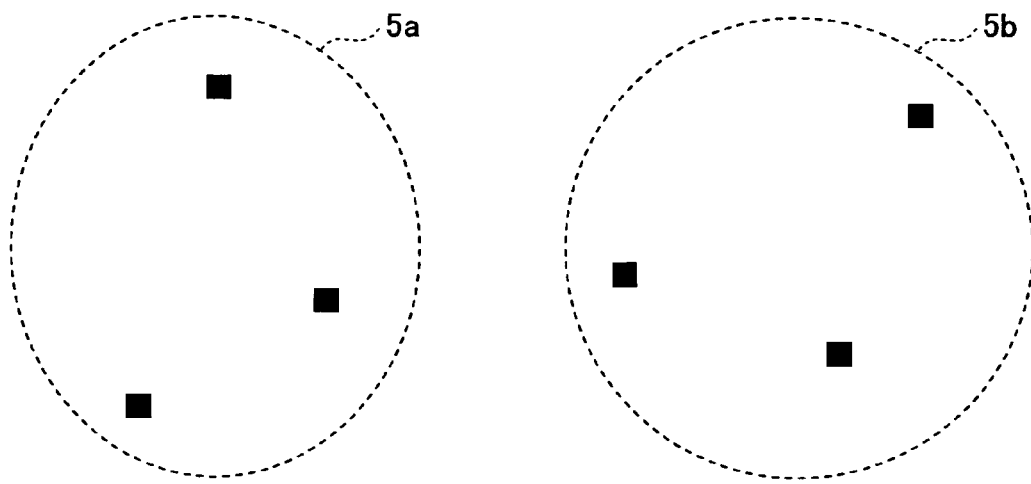
FIG. 3 is a diagram exemplifying a basic pattern and an additional pattern.

FIG. 3 is a diagram exemplifying a basic pattern and an additional pattern.

In FIG. 3, a basic pattern 5a and an additional pattern 5b have a relative angle of 45 degrees. In other words, the additional pattern 5b is obtained by rotating the basic pattern 5a by 45 degrees in the clockwise direction.

Figure 4:
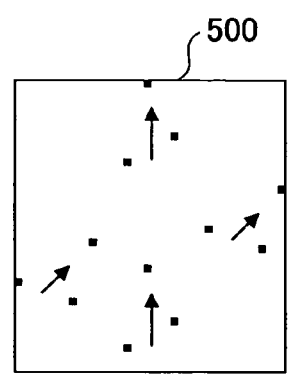
FIG. 4 is a diagram exemplifying an image having embedded information represented by a relative angle between the basic pattern and the additional pattern.

FIG. 4 is a diagram exemplifying an image having embedded information represented by a relative angle between the basic pattern and the additional pattern.

Note that the main image in FIG. 4 is the same as that in FIG. 2, namely, a drawing of a house, but in FIG. 4, illustration of the main image is omitted for simplicity. Further, in FIG. 4, arrows are presented to indicate orientations of the dot patterns, but not elements of the main image.

In FIG. 4, the total dot pattern corresponds to a combination of plural basic patterns 5a and plural additional patterns 5b, which are obtained by rotating the basic patterns 5a by 45 degrees in the clockwise direction. Here, although only two basic patterns 5a and two additional patterns 5b are illustrated for purpose of simplicity, from the point of view of practical use, it is preferable to combine plural dot patterns, as described below. In addition, from the point of view of detection accuracy, it is preferable that the number of the basic patterns 5a be equal or close to the number of the additional patterns 5b.

It should be noted that in the method shown in FIG. 4, there are no limitations to the absolute or relative positions of the basic pattern 5a and the additional pattern 5b, but they can be any values.

In addition, since it is the relative angle that is important here, in the processes of embedding and extracting the embedding method identification information, any one of the two patterns related to the relative angle can be the basic pattern or the additional pattern, and the names of the basic pattern or the additional pattern are used just for convenience.

As described above, with the method of embedding information according to the relative angle between two dot patterns, by changing the relative angle between the two dot patterns, it is possible to produce information of a few bits, that is, it is possible to embed information of a few bits. Since the maximum value of the relative angle between the basic pattern 5a and the additional pattern 5b is 180 degrees, for example, if the relative angle is quantized into eight levels in steps of 22.5 degrees, it is possible to embed information of three bits. In addition, in the present embodiment, as described below, a dot pattern can also be used to embed the target embedding information into an image, that is, the three information embedding methods for embedding the target embedding information may include a method of embedding the target embedding information by using a dot pattern; the case in which the relative angle is zero is not used for embedding the embedding method identification information. Thus, in quantization of the relative angle in steps of 22.5 degrees, the available values of the relative angle are $22.5 \times n$ (n is an integer, and $1 \leq n \leq 8$).

In the present embodiment, when the relative angle is quantized in steps of 22.5 degrees, the quantized values of the relative angle are assigned to the embedding method identification information.

FIG. 5 is a table exemplifying a relationship between the relative angle and the embedding method identification information.

As shown in FIG. 5, corresponding to the relative angles of $22.5 \times n$ ($1 \leq n \leq 8$), depending on the value of the parameter n, the value of the embedding method identification information is assigned to be 000, 001, 010, 011, 100, 101, 110, 111. With these values, the method for embedding the target embedding information in the image (namely, which method is used to embed the target embedding information) is identified.

As described below, the method of embedding information according to the relative angle between two dot patterns corresponds to a real-time method.

Next, descriptions are made of the three information embedding methods for embedding the target embedding information.

In the present embodiment, it is assumed that the three information embedding methods for embedding the target embedding information may include a method utilizing a barcode, a method of embedding information by changing a character shape, and a method of embedding information utilizing arrangement information of dot patterns having different orientation angles.

In the barcode method, a barcode image representing the target embedding information is superposed on a portion of an image (for example, one corner of a square), thereby, embedding the target embedding information. The barcode may be a two dimensional barcode. Below, the barcode method is referred to as "a first non-real-time method".

The method of embedding information by changing a character shape is effective when the main image includes characters. That is, the target embedding information is embedded by changing the character shape. This method is described in detail in reference 4. Below, the information embedding method by changing the character shape is referred to as "a second non-real-time method".

The method of embedding information utilizing arrangement information of dot patterns having different orientation angles is referred to as "a third non-real-time method".

In the third non-real-time method, information is embedded by using the relative arrangement information of the two dot patterns used in embedding the embedding method identification information (embedding information in the relative angular difference between the basic pattern 5a and the additional pattern 5b), that is, using the relative arrangement information of the basic pattern 5a and the additional pattern 5b. Specifically, the relative arrangement information of the basic pattern 5a and the additional pattern 5b corresponds to an arrangement (an array) of the basic pattern 5a and the additional pattern 5b.

Figure 6:
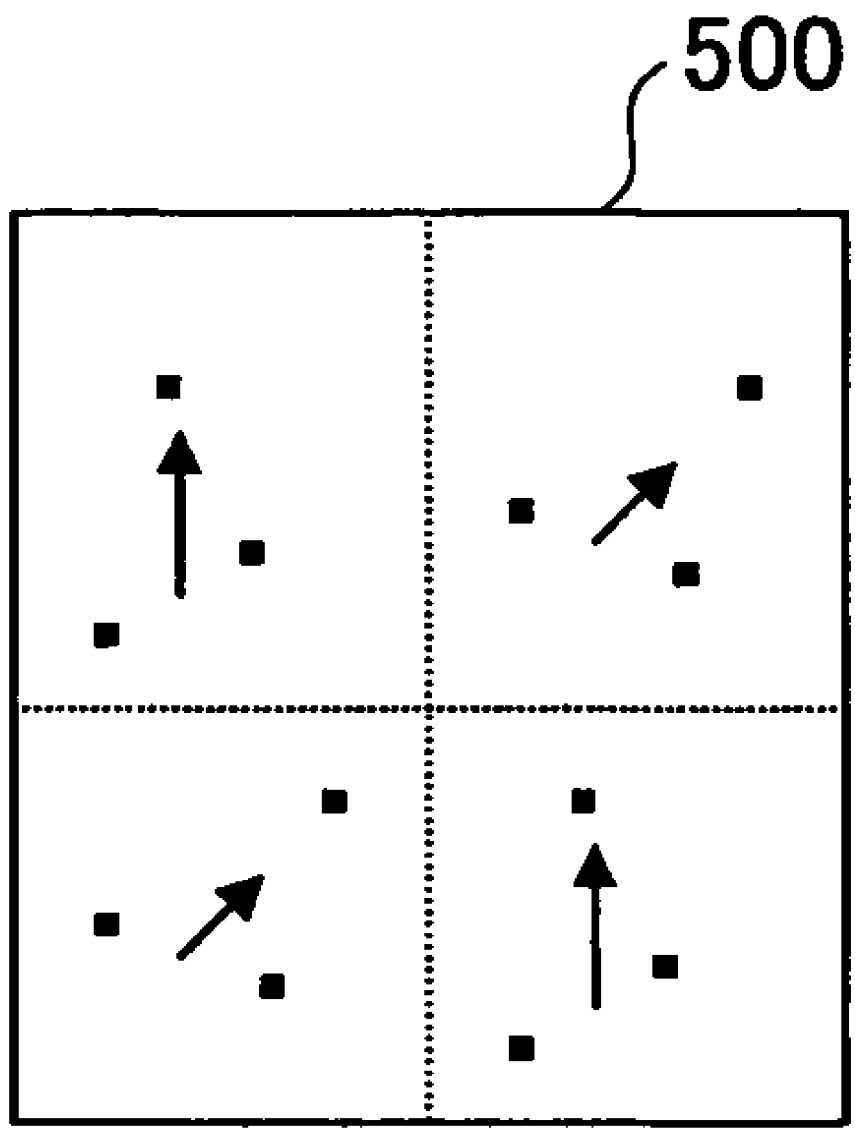
FIG. 6 is a diagram exemplifying an image having information embedded by an array of the basic pattern and the additional pattern.

FIG. 6 is a diagram exemplifying an image having information embedded by an array of the basic pattern and the additional pattern.

Specifically, FIG. 6 shows an array having a length of four, that is, there are four dot patterns in the array. In this array, dot patterns are arranged from the left side to the right side and from the upper side to the lower side; specifically, in order of a basic pattern 5a, an additional pattern 5b, a basic pattern 5a, and an additional pattern 5b. For example, if "0" is assigned to the basic pattern 5a, and "1" is assigned to the additional pattern 5b, in the image 500 in FIG. 6, a value of "0110" is embedded. Therefore, in this example, the basic pattern 5a and the additional pattern 5b are clearly distinguished from each other. However, in this example, there is no limitation to the relative angle between the basic pattern 5a and the additional pattern 5b, that is, the relative angle between the basic pattern 5a and the additional pattern 5b can have an arbitrary value. Here, the angular difference between the two dot patterns can have any recognizable value, and the value of the angular difference does not influence the embedded information.

In this example, considering information extraction precision, it is preferable that in the dot pattern array, the number of the basic patterns 5a be the same as the number of the additional patterns 5b. Therefore, in an array having a length of four as shown in FIG. 6, the target embedding information embedded in this method is shown in FIG. 7.

FIG. 7 is a table exemplifying the relationship between the arrangement and the target embedding information.

As shown in FIG. 7, when the length of the array is four, under the constraints that the number of the basic patterns 5a is the same as the number of the additional patterns 5b, six pieces of target embedding information can be embedded, and this corresponds to a number of bits a little bit greater than 2.

It should be noted that in FIG. 6, the dot patterns are enlarged only for purpose of illustration, and only a portion of the array of a small length is illustrated in FIG. 6. In practice, a large number of fine dot patterns can be embedded all over the image, and the actual length of the array is long. Therefore, it is possible to embed about 100 bits information.

In addition, in FIG. 7, the values of the embedded target embedding information are simply represented by FIGS. 0 through 5, but any kind of information can be assigned to elements of the array. When capacity of the array is about 100 bits, it is possible to assign a document ID to the image.

In the present embodiment, in the method for embedding the embedding method identification information, the dot patterns are embedded all over the background of the image. Thus, interference occurs between the method for embedding the embedding method identification information and the method for embedding the target embedding information; specifically, the bar code characters used for embedding the target embedding information are superposed on the dot patterns. This may impede extraction of the target embedding information. In order to prevent the interference, it is preferable that the dot patterns not be combined near the bar code region and the character region.

Figure 8:
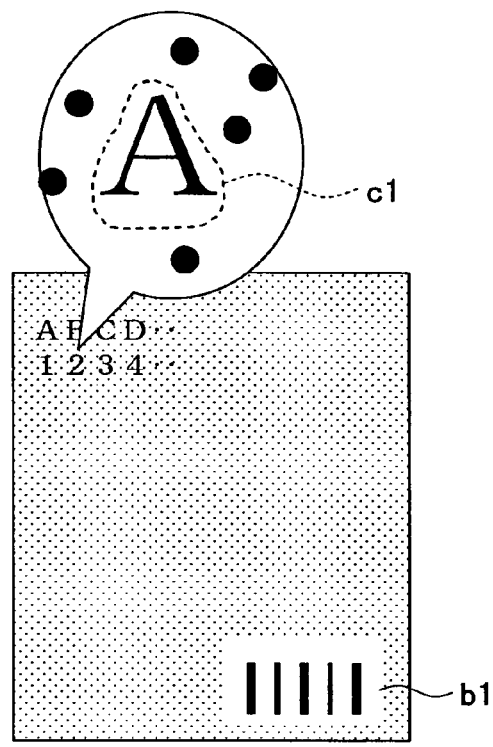
FIG. 8 is a diagram illustrating a first example for preventing the interference between the bar code or the characters with the dot patterns.

FIG. 8 is a diagram illustrating a first example for preventing the interference between the bar code or the characters with the dot patterns.

In the example shown in FIG. 8, the dot patterns are not combined near a bar code b1 or near the character c1. Due to this, it is possible to prevent the interference between the bar code or the characters and the dot patterns, and to prevent errors when extracting the target embedding information from the bar code or the character shape. For example, this technique is disclosed in Japanese Laid Open Patent Application No. 2006-229924 (hereinafter, referred to as "reference 5").

Figure 9:
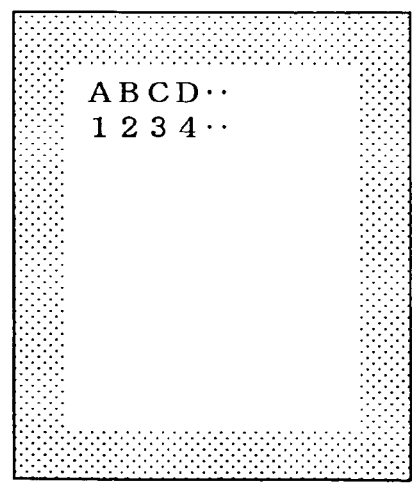
FIG. 9 is a diagram illustrating a second example for preventing the interference between the bar code or the characters with the dot patterns.

In addition, a dot pattern can be combined as shown in FIG. 9.

FIG. 9 is a diagram illustrating a second example for preventing the interference between the bar code or the characters and the dot patterns.

In the example shown in FIG. 9, the dot patterns are combined only in the peripheral area of the image, that is, the printing blank area. This can also prevent the interference between the bar code or the characters and the dot patterns.

In the method of embedding information by a dot pattern array, the same dot pattern can be used as in the method of embedding information by the relative angle of the dot patterns. Due to this, the same dot pattern can be used to embed two fold of information, and this prevents the interference between the method for embedding the embedding method identification information and the method for embedding the target embedding information.

Specifically, as shown in FIG. 5 and FIG. 7, it is required to embed the embedding method identification information having a value of "001" according to the relative angle between the basic pattern 5a and the additional pattern 5b. Additionally, it is required to embed the target embedding information "1" according to the dot pattern array. In this case, it is sufficient that the relative angle between the basic pattern 5a and the additional pattern 5b be set to be 45 degrees, and the basic pattern 5a and the additional pattern 5b be arranged in order as shown in FIG. 6. Thus, when extracting information, it is detected that the relative angle between the basic pattern 5a and the additional pattern 5b is 45 degrees, and the array of the basic pattern 5a and the additional pattern 5b is that as shown in FIG. 6. Therefore, it is possible to extract appropriate information for embedding the embedding method identification information and appropriate information for embedding the target embedding information. This is because in the method for embedding the embedding method identification information based on the relative angle of the dot patterns, the relative positional arrangement of the two dot patterns is allowed to be arbitrary values, whereas in the method for embedding the target embedding information based on the dot pattern array, the relative angle of the dot patterns is allowed to be arbitrary values, thus, the two methods are compatible with each other.

As described above, in the present embodiment, at most three non-real-time information embedding methods may be used to embed the target embedding information. Under this condition, embedding states of the target embedding information to be embedded in the image and the corresponding embedding method identification information are as follow.

FIG. 10 is a table exemplifying a relationship between the embedding states of the target embedding information and the embedding method identification information.

In FIG. 10, the three bits of the embedding method identification information are assigned, from the highest-order bit to the lowest-order bit, to the first non-real-time method, the second non-real-time method, and the third non-real-time method, respectively. When the value of a bit is "1", it indicates that the information embedding method corresponding to this bit is used to embed the target embedding information. When the value of a bit is "0", it indicates that the information embedding method corresponding to this bit is not used to embed the target embedding information. Thus, when the value of the embedding method identification information is "000", it indicates that none of the three information embedding methods is used to embed the target embedding information. When the value of the embedding method identification information is "100", it indicates that only the first non-real-time method is used to embed the target embedding information. When the value of the embedding method identification information is "111", it indicates that all of the first non-real-time method, the second non-real-time method, and the third non-real-time method, are used to embed the target embedding information.

Below, an image processing device for executing the above information embedding method is described.

Figure 11:
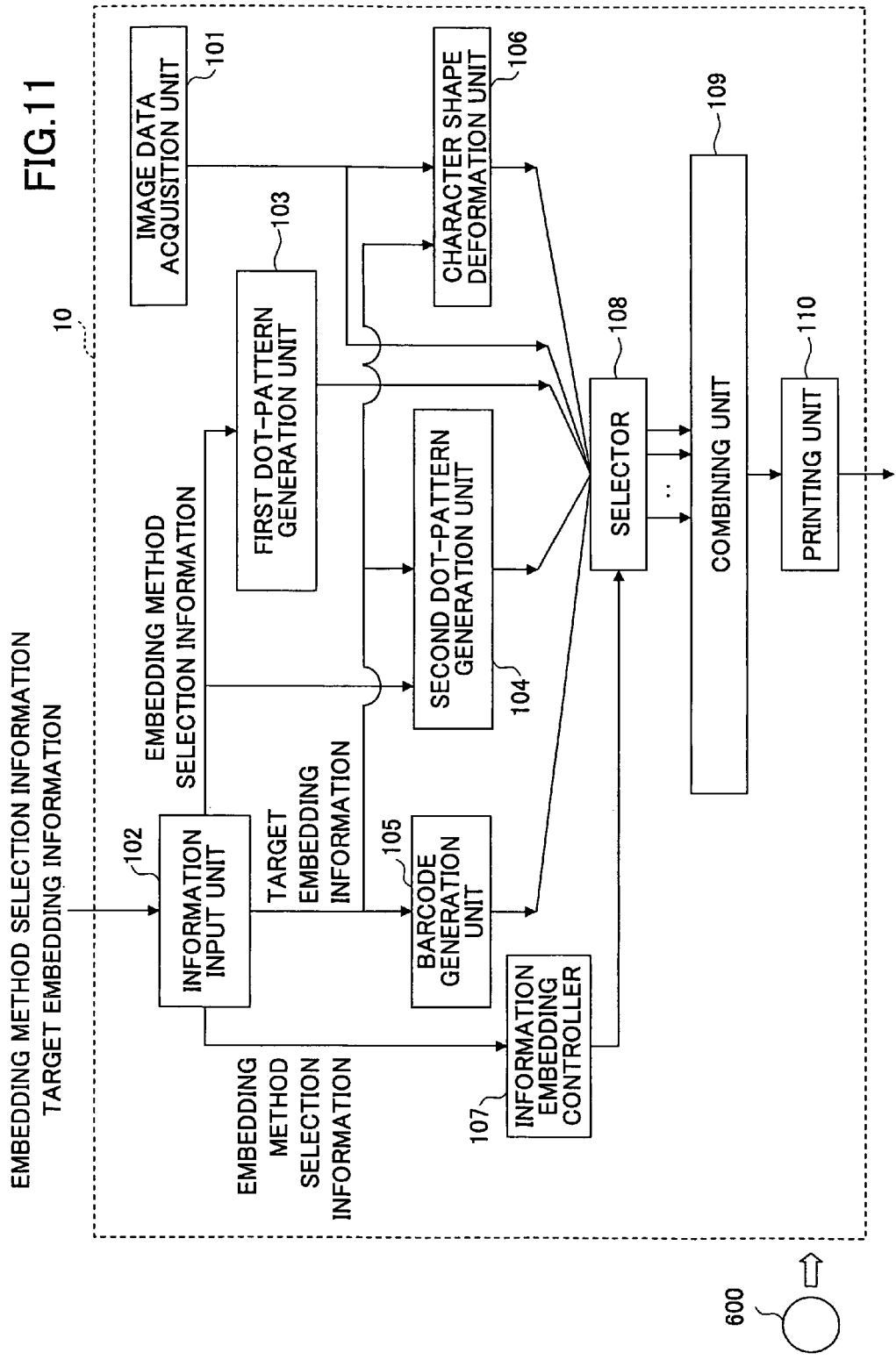
FIG. 11 is a block diagram exemplifying a configuration of an image processing device 10 for executing the information embedding method according to the present embodiment of the present invention.

FIG. 11 is a block diagram exemplifying a configuration of an image processing device 10 for executing the information embedding method according to the present embodiment of the present invention.

The image processing device 10 as shown in FIG. 11 is a versatile computer, a printer or a multi-function peripheral (MFP) with application software installed therein.

As shown in FIG. 11, the image processing device 10 includes an image data acquisition unit 101, an information input unit 102, a first dot-pattern generation unit 103, a second dot-pattern generation unit 104, a barcode generation unit 105, a character shape deformation unit 106, an information embedding controller 107, a selector 108, a combining unit 109, and a printing unit 110.

The image data acquisition unit 101 acquires or generates data of a target image into which information is to be embedded. Below, the data of a target image are referred to as "target image data". For example, the image data acquisition unit 101 may include word-processor software for generating document data, programs for converting the document data generated by the word-processor software to image data, or a device for reading image data stored in advance.

The information input unit 102 receives the target embedding information, which is to be embedded in the target image, and input data indicating which of the first non-real-time method, the second non-real-time method, and the third non-real-time method is selected for embedding the target embedding information. This input information is referred to as "embedding method selection information".

The first dot-pattern generation unit 103 receives the embedding method selection information. The first dot-pattern generation unit 103 determines the value of the embedding method identification information according to the embedding method selection information, and generates image data (dot pattern data) of the two dot patterns (the basic pattern 5a and the additional pattern 5b) which have a relative angle representing the obtained value of the embedding method identification information, and outputs the dot pattern data.

When determining the value of the embedding method identification information from the embedding method selection information, for example, a table showing the relationship between the embedding method identification information and the embedding method selection information may be stored in a storage device of the image processing device 10 beforehand, and the determination of the embedding method identification information can be performed based on the table.

The second dot-pattern generation unit 104 receives the embedding method selection information and the target embedding information. The second dot-pattern generation unit 104 determines the value of the embedding method identification information according to the embedding method selection information, and determines the relative angle which represents the obtained value of the embedding method identification information. In addition, the second dot-pattern generation unit 104 determines the dot pattern array which represents the target information. The second dot-pattern generation unit 104 generates dot pattern data (a second dot pattern) so that the basic pattern 5a and the additional pattern 5b have the obtained relative angle, and are arranged to form the obtained array. Then, the second dot-pattern generation unit 104 outputs the dot pattern data.

The barcode generation unit 105 receives the target embedding information. The barcode generation unit 105 generates image data of a barcode (below, referred to as "barcode data") according to the target embedding information, and outputs the barcode data.

The character shape deformation unit 106 receives the target image data and the target embedding information. The character shape deformation unit 106 deforms the shape of characters included in the target image according to the target embedding information, and outputs the target image data with a deformed character shape.

The information embedding controller 107 controls the selector 108 according to the embedding method selection information input to the information input unit 102 so as to select the method for embedding the target embedding information. That is, due to the information embedding controller 107 and the selector 108, data output from the first dot-pattern generation unit 103, the second dot-pattern generation unit 104, the barcode generation unit 105, and the character shape deformation unit 106 are selected or refused.

The combining unit 109 combines the data selected by the selector 108 on the target image, thereby, generating image data with the target embedding information being embedded.

The printing unit 110 prints the image data generated in the combining unit 109 on a sheet medium (for example, paper).

The image data acquisition unit 101, the information input unit 102, the first dot-pattern generation unit 103, the second dot-pattern generation unit 104, the barcode generation unit 105, the character shape deformation unit 106, the information embedding controller 107, the selector 108, the combining unit 109, and the printing unit 110 can be realized by hardware, for example, by electronic circuits, or by software.

When these components are realized by hardware, for example, in response to the input of the target embedding information and the embedding method selection information, the first dot-pattern generation unit 103, the second dot-pattern generation unit 104, the barcode generation unit 105, and the character shape deformation unit 106 can be operated in parallel. Data output from these components are selected or refused by the selector 108 under control of the information embedding controller 107 based on the embedding method selection information. The data selected by the selector 108 are output to the combining unit 109.

For example, when the first non-real-time method is specified in the embedding method selection information, the dot pattern data from the first dot-pattern generation unit 103 and the barcode data from the barcode generation unit 105 are output to the combining unit 109. The combining unit 109 combines the dot pattern data and the barcode data on the target image data.

When the second non-real-time method is specified in the embedding method selection information, the dot pattern data from the first dot-pattern generation unit 103 and the target image data with a deformed character shape from the character shape deformation unit 106 are output to the combining unit 109. The combining unit 109 combines the dot pattern data on the target image data from the character shape deformation unit 106. That is, when the second non-real-time method is specified, the selected dot pattern data or barcode data are superposed on the target image data from the character shape deformation unit 106.

When the third non-real-time method is specified in the embedding method selection information, the dot pattern data from the second dot-pattern generation unit 104 are output to the combining unit 109. The combining unit 109 combines the dot pattern data on the target image data.

When none of the non-real-time methods is specified in the embedding method selection information, the dot pattern data from the first dot-pattern generation unit 103 are output to the combining unit 109.

Figure 12:
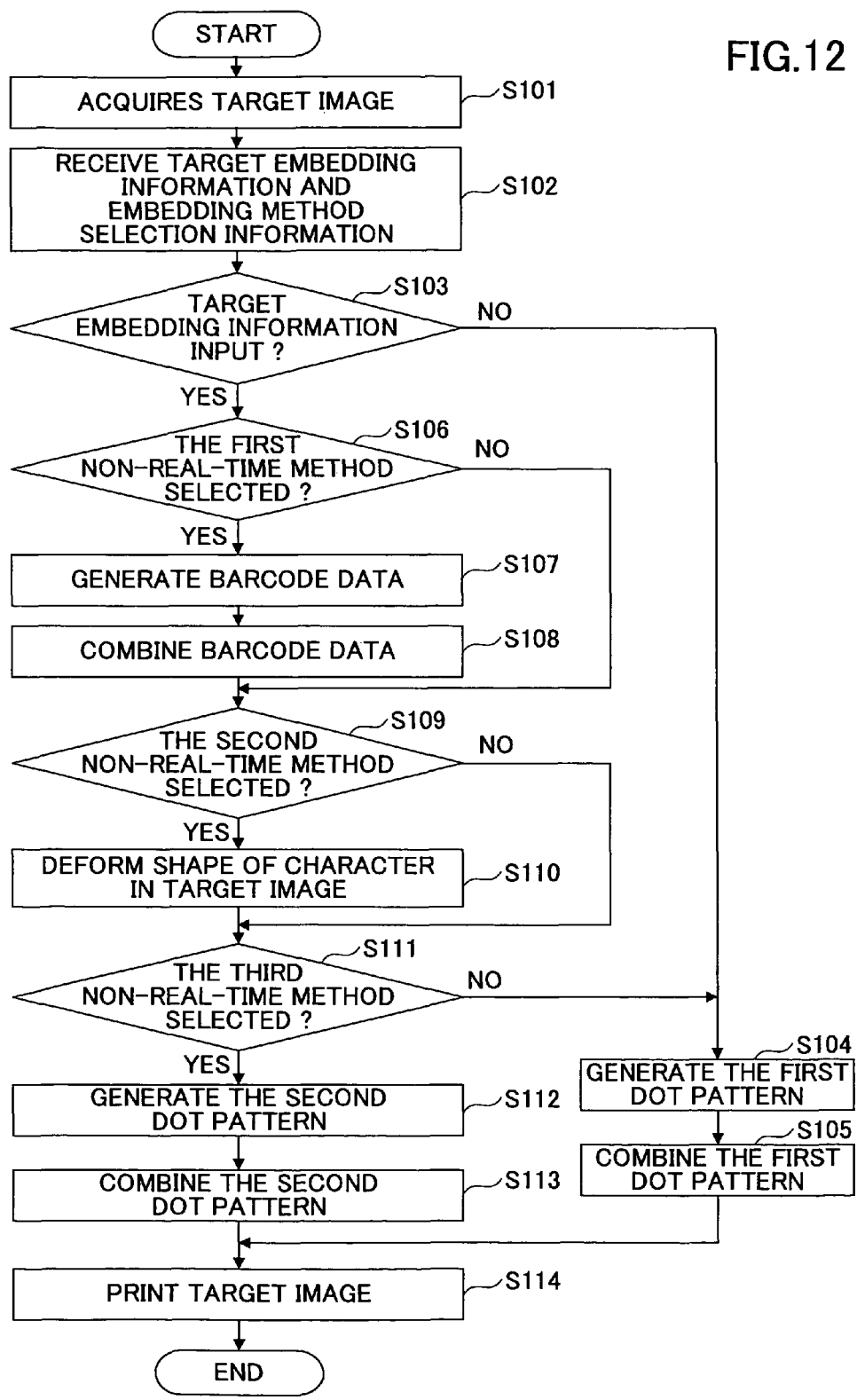
FIG. 12 is a flowchart illustrating information embedding operations in the image processing device 10.

When the image data acquisition unit 101, the information input unit 102, the first dot-pattern generation unit 103, the second dot-pattern generation unit 104, the barcode generation unit 105, the character shape deformation unit 106, the information embedding controller 107, the selector 108, the combining unit 109, and the printing unit 110 are realized by software, the relevant programs are executed to drive a CPU of a computer to perform operations as shown in FIG. 12. For example, these programs can be stored in a ROM of the image processing device 10 in advance, or be downloaded through a network, or be installed from a recording medium 600 like a CD-ROM.

FIG. 12 is a flowchart illustrating information embedding operations in the image processing device 10.

As shown in FIG. 12, in step S101, the image data acquisition unit 101 acquires the target image in which information is to be embedded, and expands the target image in a memory of the image processing device 10.

In step S102, the information input unit 102 receives the target embedding information and the embedding method selection information. For example, the target embedding information can be input through an input screen image displayed on a display device.

In step S103, when it is determined that the target embedding information is not input, the routine proceeds to step S104. Otherwise, the routine proceeds to step S106.

In step S104, the first dot-pattern generation unit 103 determines that the value of the embedding method identification information is "000", and generates dot pattern data (a first dot pattern) of the basic pattern 5a and the additional pattern 5b which have a relative angle (22.5 degrees) representing the value (000) of the embedding method identification information.

In step S105, the combining unit 109 combines the dot pattern data on the target image. Then, the routine proceeds to step S114.

In step S106, since the target embedding information is input, the information embedding controller 107 determines, according to the embedding method selection information, whether the first non-real-time method is selected. When the first non-real-time method is selected, the routine proceeds to step S107, otherwise, the routine proceeds to step S109.

In step S107, since the first non-real-time method is selected, the barcode generation unit 105 generates barcode data according to the target embedding information.

In step S108, the combining unit 109 combines the barcode data on the target image.

Note that when the first non-real-time method is not selected, the step 107 and the step 108 are not executed.

In step S109, the information embedding controller 107 determines, according to the embedding method selection information, whether the second non-real-time method is selected. When the second non-real-time method is selected, the routine proceeds to step S110, otherwise, the routine proceeds to step S111.

In step S110, since the second non-real-time method is selected, the character shape deformation unit 106 deforms the shape of characters included in the target image according to the target embedding information.

Note that when the second non-real-time method is not selected, the step 110 is not executed.

In step S111, the information embedding controller 107 determines, according to the embedding method selection information, whether the third non-real-time method is selected. When the third non-real-time method is selected, the routine proceeds to step S112, otherwise, the routine proceeds to step S104.

In step S112, since the third non-real-time method is selected, the second dot-pattern generation unit 104 generates dot pattern data (the second dot pattern) according to the target embedding information and the embedding method selection information.

In step S113, the combining unit 109 combines the second dot pattern on the target image.

In step S114, the printing unit 110 prints the target image with a printer.

Note that when the third non-real-time method is not selected in step S111, instead of the step 112 and the step 113, the step 104 and the step 105 are executed. This is because when the embedding method identification information is not included in the second dot pattern generated by the second dot-pattern generation unit 104, and thus the second dot pattern generated by the second dot-pattern generation unit 104 is not combined; if the first dot pattern generated by the first dot-pattern generation unit 103 is not combined, there is no embedding method identification information embedded in the target image.

When none of the non-real-time methods is selected for information embedding, the dot pattern indicating embedding method identification information on the target image can be omitted.

Next, information extraction is described.

Figure 13:
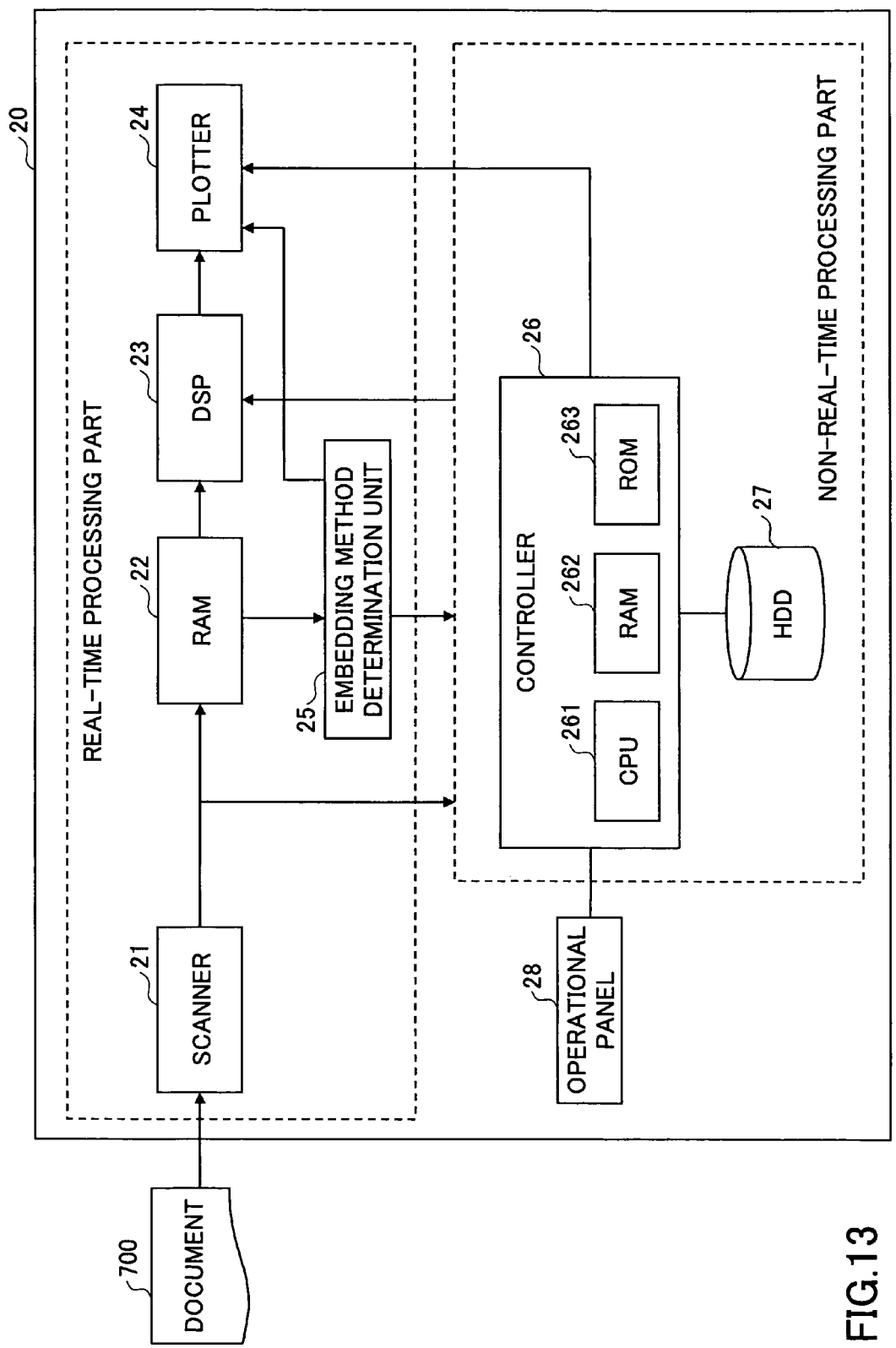
FIG. 13 is a block diagram exemplifying a configuration of an image processing device 20 for executing an information extracting method according to the present embodiment of the present invention.

FIG. 13 is a block diagram exemplifying a configuration of an image processing device 20 for executing an information extracting method according to the present embodiment of the present invention.

As shown in FIG. 13, the image forming device 20 includes a scanner 21, a RAM 22, a DSP (Digital Signal Processor) 23, a plotter 24, an embedding method determination unit 25, a controller 26, a hard disk drive (HDD) 27, and an operational panel 28.

The scanner 21 reads image data from a document 700. The obtained image data are input to the RAM 22.

The RAM 22 provides a memory area used as a line memory for outputting the image data in a FIFO manner. For the purpose of high-speed image processing and cost reduction of the image processing device 20, for example, the line memory has a capacity able to hold several tens lines. Namely, the line memory can accommodate only a part of the image data, or equivalently, only a part of the image data can be expanded in the line memory.

The DSP 23 is a processor for executing various kinds of image processing on the input image data, such as texture removal, Gamma correction, gray-level conversion, and others.

The embedding method determination unit 25 is a circuit which detects dot patterns from the image data, and extracts the embedding method identification information based on the relative angular difference between two dot patterns. Note that the embedding method determination unit 25 may be formed by software. In this case, programs for realizing the embedding method determination unit 25 are loaded in the RAM 22, and are driven to be executed by the DSP 23, thereby realizing functions of the embedding method determination unit 25.

The controller 26 includes a CPU 261, a RAM 262, and a ROM 263. The controller 26 performs image processing (including information extraction) when it is difficult or it is inappropriate for the RAM 22 and the DSP 23 to do it due to memory constraints, complicity or difficulty of the processing. In addition, the controller 26 controls other functions of the image forming device 20.

The ROM 263 stores programs for realizing functions of the controller 26 and data utilized by the programs.

The RAM 262 is used as a memory area for loading the above programs when executing the programs. The RAM 262 is also used as a frame memory for holding the image data used in image processing in the controller 26. The frame memory has a capacity able to hold image data at least sufficient for the image processing. For example, the frame memory has a capacity able to hold all the image data obtained when reading the document 700. For this purpose, the capacity of the frame memory should be at least greater than that of the line memory of the RAM 22.

The CPU 261 executes the programs loaded in the RAM 262 to perform the above image processing.

The HDD 27 stores document management information. Here, the document management information means information including document IDs or attribute information of each document.

The operational panel 28 may include a liquid crystal panel or buttons, and is used for an operator to input data.

The document 700 is printed by the plotter 24.

Corresponding to the terms of "non-real-time information embedding method" and "real-time information embedding method" used above, for simplicity, the image processing device 20 can be divided into a non-real-time processing part and a real-time processing part for performing non-real-time processing and real-time processing, respectively. Specifically, the scanner 21, the RAM 22, the DSP 23, the plotter 24, the embedding method determination unit 25 are included in the real-time processing part, and the controller 26 and the hard disk drive (HDD) 27 are included in the non-real-time processing part.

Below, software for executing, in CPU 261, extraction of target embedding information is described.

Figure 14:
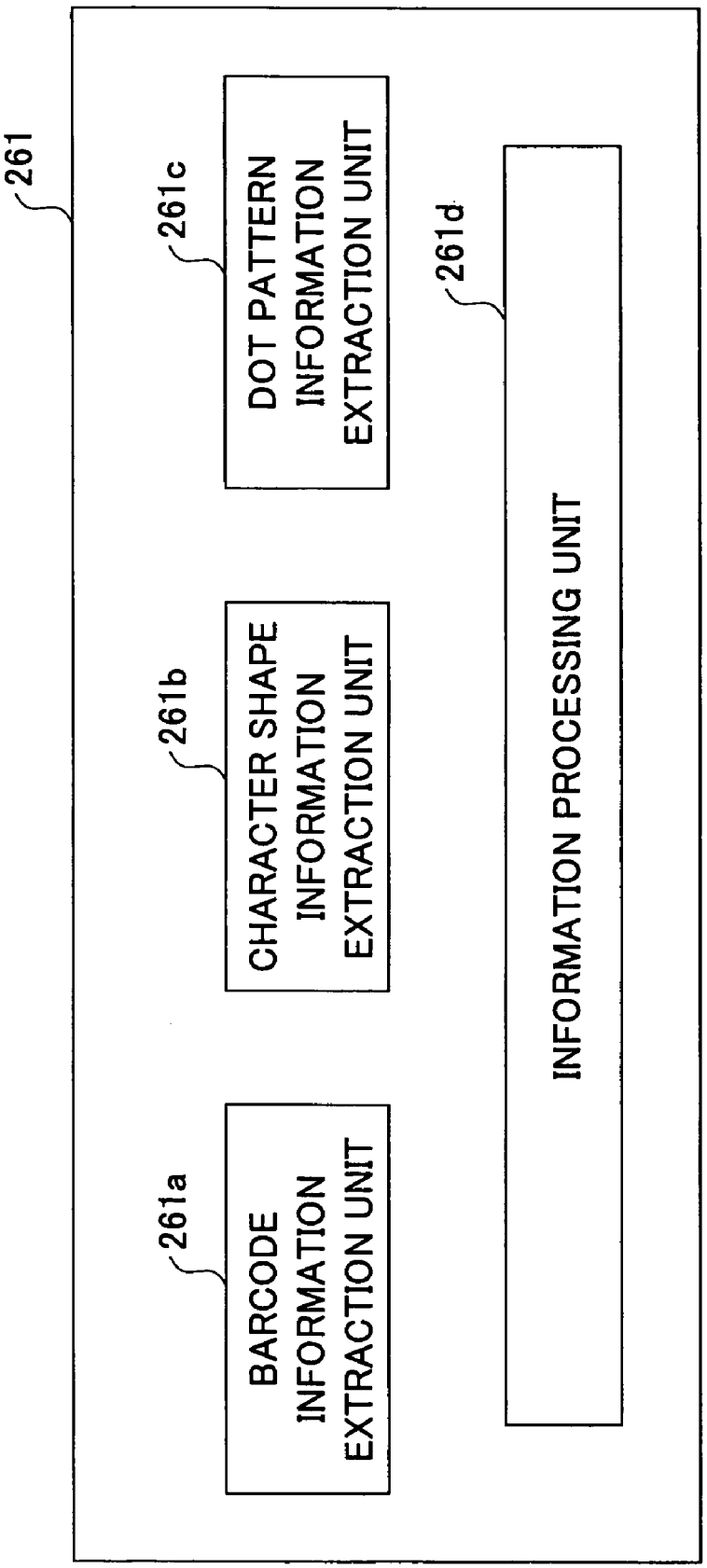
FIG. 14 is a block diagram exemplifying a software configuration of the CPU 261 for realizing functions of target embedding information extraction according to the present embodiment of the present invention.

FIG. 14 is a block diagram exemplifying a software configuration of the CPU 261 for realizing functions of target embedding information extraction according to the present embodiment of the present invention.

As shown in FIG. 14, the CPU 261 includes a barcode information extraction unit 261a, a character shape information extraction unit 261b, a dot pattern information extraction unit 261c, and an information processing unit 261d.

The barcode information extraction unit 261a extracts information embedded by the first non-real-time method from an image. In other words, the barcode information extraction unit 261a detects a barcode combined in the image, and extracts information embedded in the barcode.

The character shape information extraction unit 261b extracts information embedded by the second non-real-time method from the image. In other words, the character shape information extraction unit 261b extracts information embedded though the shape of characters included in the image.

The dot pattern information extraction unit 261c extracts information embedded by the third non-real-time method from the image. In other words, the dot pattern information extraction unit 261c detects the dot pattern combined in the image, and extracts information embedded in the dot pattern array.

The information processing unit 261d performs control according to values of the extracted information.

Below, operations of the image processing device 20 shown in FIG. 13 are explained.

Figure 15:
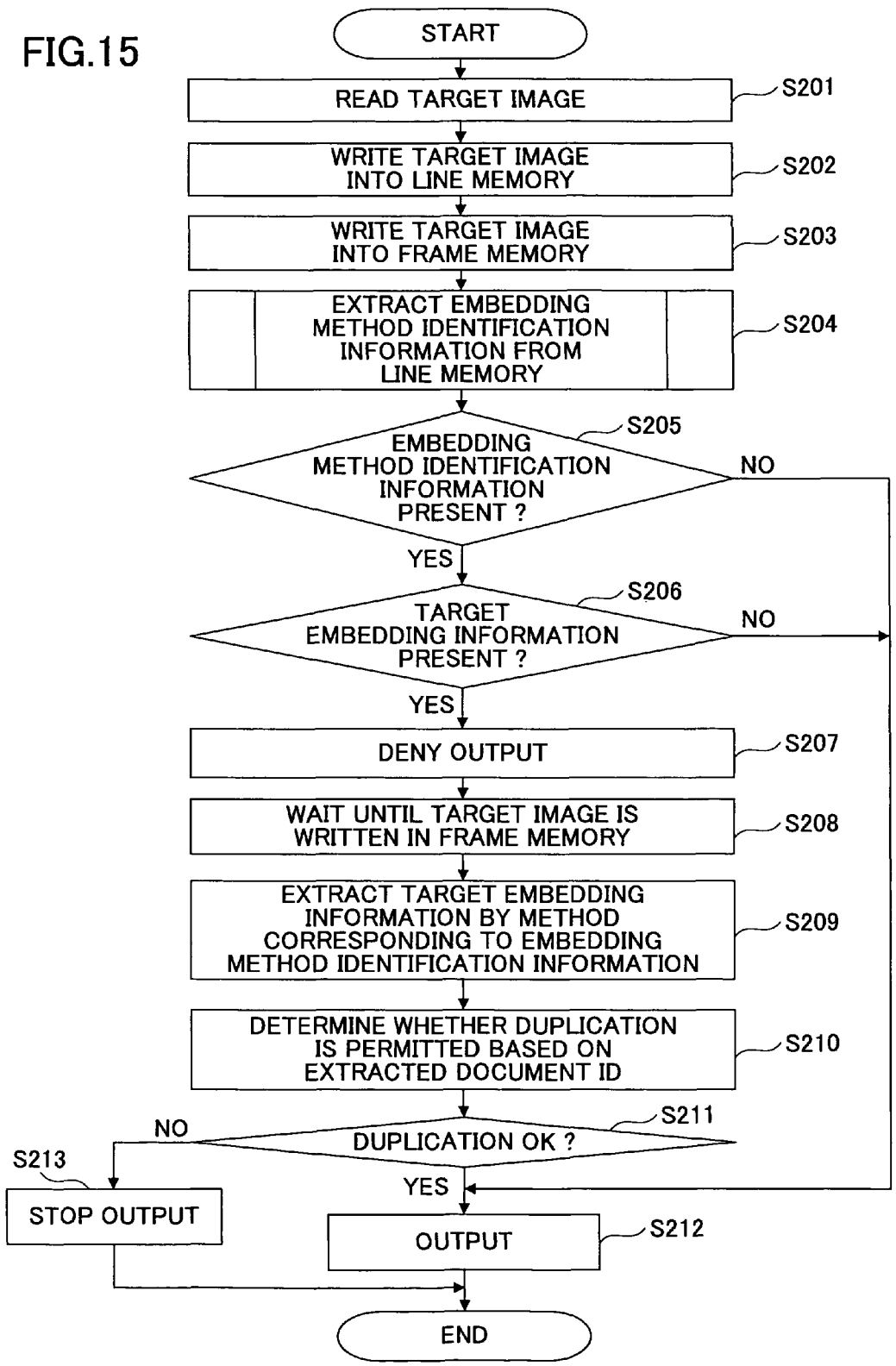
FIG. 15 is a flowchart illustrating information extraction operations in the image processing device 20.

FIG. 15 is a flowchart illustrating information extraction operations in the image processing device 20.

In the following, assume the information embedded in the document 700 is a document ID, and duplication of the document 700 is controlled according to the document ID. Here, for example, the document ID is a document ID of image data, which is defined in a computer system (for example, a document management system) and is printed on the document 700. Further, it is assumed that in the computer system, access control information is assigned to each document that is under control, which indicates whether the document can be duplicated.

In FIG. 15, in step S201, when an instruction to duplicate the document 700 is input from the operational panel 28, the scanner 21 of the image forming device 20 reads an image from the document 700. Below, the image on the document 700 is referred to as "target image".

In steps S202 and S203, the obtained lines of the image data are written into the line memory of the RAM 22 and the frame memory of the RAM 262.

In step S204, when the line memory is full of data from the lines of the target image, the embedding method determination unit 25 detects dot patterns (the basic pattern 5a and the additional pattern 5b) from the target image loaded in the line memory, and determines the relative angle between the basic pattern 5a and the additional pattern 5b, thereby extracting the embedding method identification information.

In addition, in the real-time processing part of the image forming device 20, the DSP 23 performs various kinds of image processing on the target image in the line memory nearly at the same time as the operations by the embedding method determination unit 25.

Note that the target image in the line memory changes frequently in units of lines because once new lines are input to the line memory, the oldest lines are output. In the real-time processing part of the image processing device 20, the image processing is performed in a real-time manner following the change of the image data in the line memory. From the point of view of detection precision, it is preferable that dot pattern detection by the embedding method determination unit 25 be performed each time the image data in the line memory changes. However, as described below, the embedding method identification information can be extracted before all the lines of the image of the document 700 are read in.

In step S205, the embedding method determination unit 25 determines whether the embedding method identification information is extracted.

When it is determined that the embedding method identification information is extracted, the routine proceeds to step S206. Otherwise, the routine proceeds to step S212.

In step S206, the embedding method determination unit 25 determines, according to the value of the embedding method identification information, whether the target embedding information is embedded in the target image. For example, the embedding method determination unit 25 makes this determination based on the table shown in FIG. 10. Note that information equivalent to that in the table shown in FIG. 10 is also stored in the image processing device 20.

When it is determined that the target embedding information is embedded in the target image in the above-mentioned three non-real-time information embedding methods, that is, the embedding method identification information has a value other than "000", the routine proceeds to step S207. Otherwise, the routine proceeds to step S212.

In step S207, since it is determined that the embedding method identification information has a value other than "000", the embedding method determination unit 25 directs the plotter 24 to deny output processing.

In the real-time processing part of the image forming device 20, even if all the lines of the image of the document 700 are not read in, the output processing by the plotter 24 can be started in response to completion of the image processing by the DSP 23. This is because duplication of the document, a document ID of which document is embedded as the target embedding information, is probably not allowed.

Next, the embedding method determination unit 25 directs the controller 26 to extract the target embedding information through a method corresponding to the value of the embedding method identification information by utilizing the information extraction functions of the controller 26 corresponding to at least one of the barcode information extraction unit 261*a*, the character shape information extraction unit 261*b*, and the dot pattern information extraction unit 261*c*.

In step S208, the controller 26, which receives the instruction to extract the target embedding information, waits for a while until lines of the target image sufficient for extracting the target embedding information are written into the frame memory of the RAM 262. Since the barcode, character shape, or the dot pattern array is affected by the direction in which the target image is read out, while the document 700 can be set in any direction by the user; basically, the controller 26 waits until all the lines of the target images are written in the frame memory of the RAM 262.

In step S209, when sufficient lines of the target images are written in the frame memory of the RAM 262, one of the barcode information extraction unit 261*a*, the character shape information extraction unit 261*b*, and the dot pattern information extraction unit 261*c*, which one receives the instruction from the embedding method determination unit 25, extracts the target embedding information from the frame memory by the method corresponding to the value of the embedding method identification information.

In step S210, the information processing unit 261*d* determines whether duplication of the document 700 is allowed according to the extracted document ID. For example, the information processing unit 261*d* acquires security information of the document ID from a document management system built in a HDD 27 or a computer connected through a network, and determines whether duplication of the document 700 is allowed based on the security information.

In step S211, when it is determined that duplication of the document 700 is allowed, the routine proceeds to step S212. Otherwise, the routine proceeds to step S213.

In step S212, since duplication of the document 700 is allowed, the information processing unit 261*d* lifts the output standby status in the plotter 24, and a copy of the document 700 is printed by the plotter 24 on a printing sheet (output).

In step S213, since duplication of the document 700 is not allowed, the information processing unit 261*d* directs the plotter 24 to stop output. Thus, the duplication of the document 700 is stopped. In addition, the information processing unit 261*d* may direct the DSP 23 to print out the output image, or to take other measures. Then, the information processing unit 261*d* may lift the output standby status in the plotter 24, and an image obtained by printing out the target image on the document 700 is printed by the plotter 24 on a printing sheet (output); thus, un-authorized duplication is equivalently prevented.

When the embedding method determination unit 25 determines there is no embedding method identification information in step S205, or when it is determined that the target embedding information is not embedded in the target image in the above-mentioned three non-real-time information embedding methods, that is, the embedding method identification information has a value of "000", the embedding method determination unit 25 does not direct the plotter 24 to be in standby for output processing, nor direct the controller 26 to extract the target embedding information. Hence, in this case, the plotter 24 does not wait for extraction of the target embedding information, but directly outputs an image. Namely, just the same as usual duplication, the plotter 24 outputs a copy of the document 700 on a printing sheet. Here, "usual duplication" means duplication with the function of target embedding information extraction being invalid. Further, in the same embodiment, the same duplication performance can be obtained as that of the usual duplication, because influence from extraction processing of the embedding method identification information on the duplication process is small in the same embodiment.

Below, extraction of the embedding method identification information is described.

Figure 16:
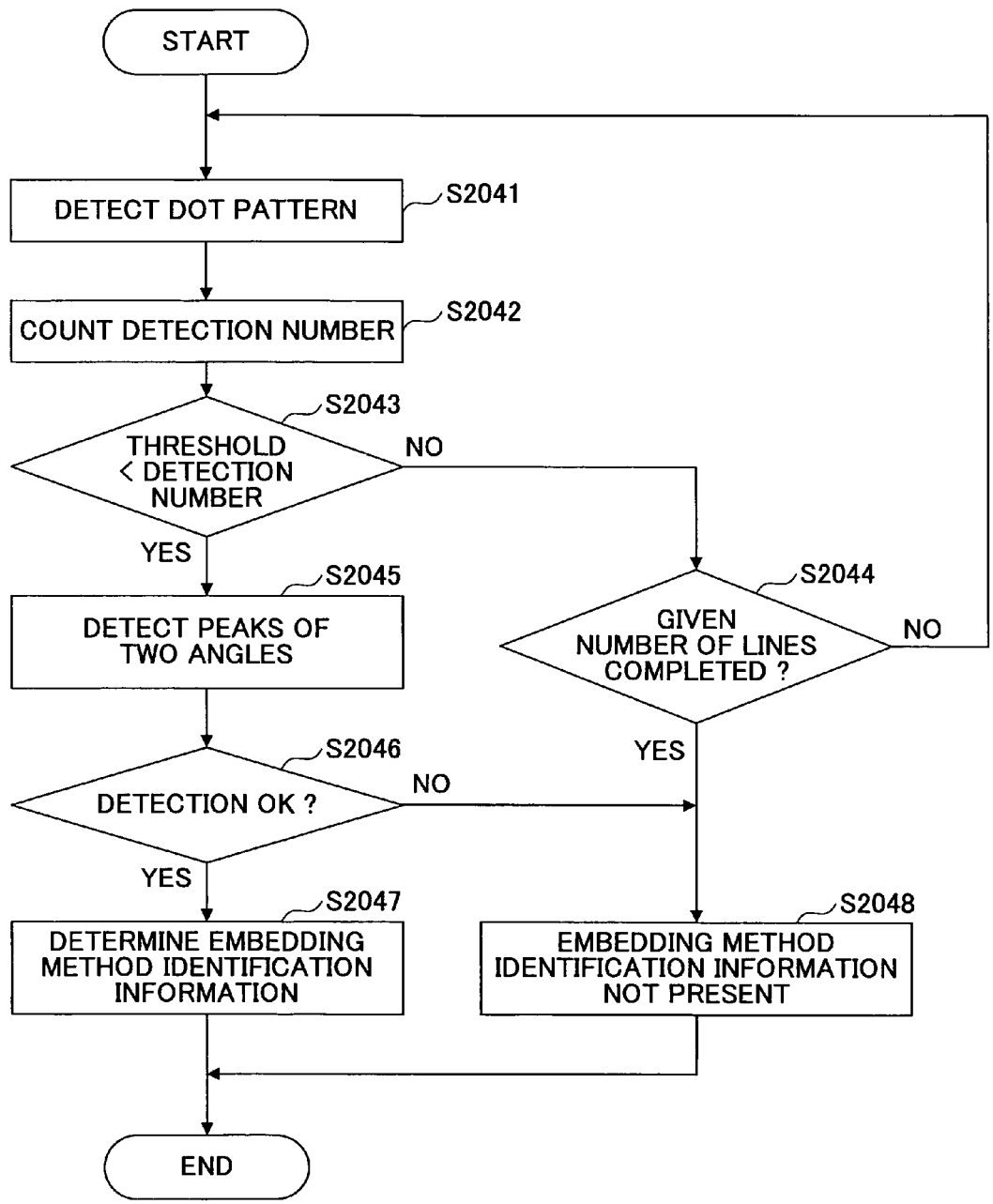
FIG. 16 is a flowchart illustrating extraction of the embedding method identification information operations by the embedding method determination unit 25.

FIG. 16 is a flowchart illustrating extraction of the embedding method identification information operations by the embedding method determination unit 25.

As shown in FIG. 16, in step S2041, the dot patterns are detected from the line memory. For example, the dot patterns are detected through pattern matching by using the pattern dictionary stored in the image processing device 10.

FIG. 17 is schematic view exemplifying a pattern dictionary.

Specifically, FIG. 17 shows a pattern dictionary including 16 patterns obtained by rotating the dot pattern 5*a* in steps of 22.5 degrees. Below, the 16 patterns constituting the pattern dictionary are referred to as "master patterns". In addition, in FIG. 17, it is illustrated that the center coordinates of the rectangular region including the dot pattern 5*a* are used as a rotational center.

On the other hand, for example, a few lines of the target image are stored in the line memory, as shown below.

Figure 18:
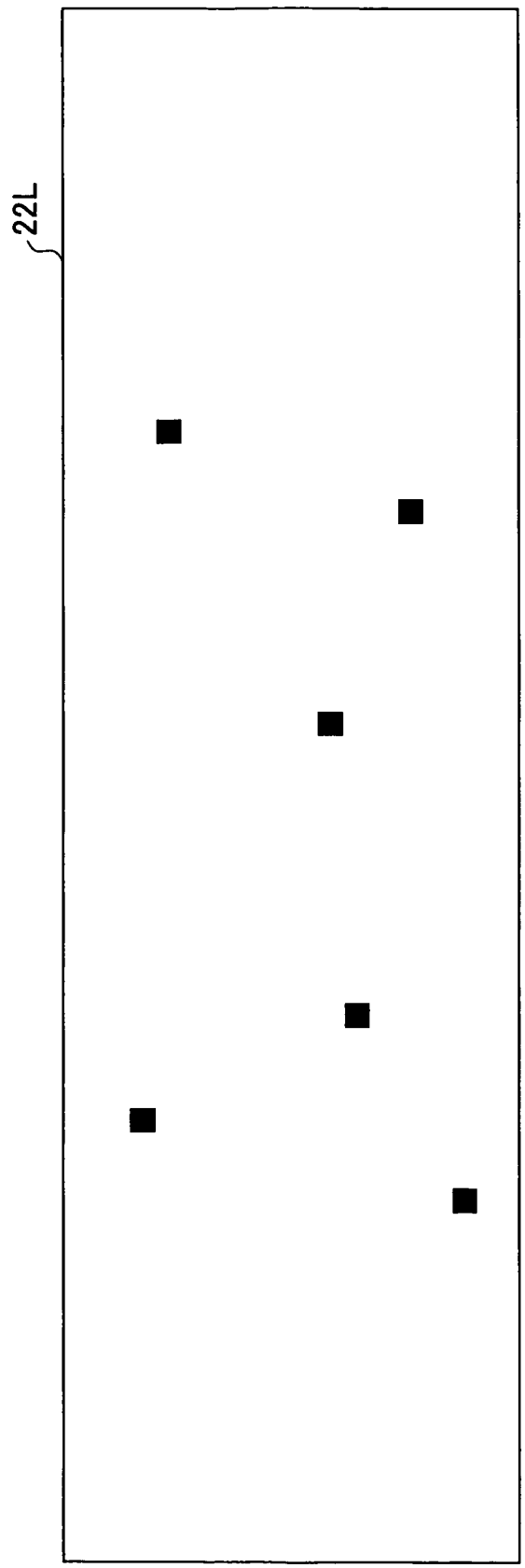
FIG. 18 is a schematic view illustrating a line memory.

FIG. 18 is a schematic view illustrating a line memory.

In FIG. 18, in a line memory 22L, there are two dot patterns. The pattern matching is performed on the image data in the line memory 22L. Therefore, it is necessary that the number of lines in the line memory 22L be equal to or greater than the number of dots in the vertical direction and the horizontal direction of the dot patterns to be detected. In FIG. 17, each dot pattern has 15×15 dots; hence it is necessary that the number of lines in the line memory 22L be equal to or greater than 15 lines.

The pattern matching is performed with the image in the line memory 22L being compared to each of the dot patterns in the pattern dictionary while shifting the image in the line memory 22L one pixel each time.

In step S2042, each time the pattern matching is performed (that is, each time the dot pattern is detected), the total number of detected dot patterns and the total number of detected dot patterns at each dot pattern angle are incremented. The dot pattern angle is determined by the angle of the master pattern at the time of pattern detection.

In step S2043, it is determined whether the total number of detected dot patterns is greater than a given threshold value. If the total number of detected dot patterns is greater than the threshold value, the routine proceeds to step S2045. Otherwise, the routine proceeds to step S2044.

In this way, the pattern matching is performed each time the line memory 22L is updated until the total number of detected dot patterns is greater than the threshold value.

For example, the object of setting the threshold value is to prevent incorrect determination when pattern matching happens accidentally.

In step S2045, since the total number of detected dot patterns is greater than the threshold value, detection of the dot pattern 5a is stopped, and it is attempted to detect two peaks for the total number of detected dot patterns at each angle. In other words, the two angles related to the two largest numbers of detections are determined.

In step S2046, when the two peaks are detected, the routine proceeds to step S2047, otherwise, the routine proceeds to step S2048.

In step S2047, the value of the embedding method identification information is determined based on the angular difference between the two angles related to the two peaks. In other words, the angular difference corresponds to the relative angular difference between the basic pattern 5a and the basic pattern 5b.

Determination of the value of the embedding method identification information is performed based on the table in FIG. 5. Namely, the value corresponding to the angular difference is found from the table in FIG. 5. For example, information shown in the table in FIG. 5 is also stored in a storage device of the image processing device 10.

In step S2044, if the dot pattern detection number does not exceed the threshold value even when the given number of lines of the image has been detected, the detection is stopped. In this case, in step S2048, it is determined that the embedding method identification information is not embedded. The given number of lines may be set to be a value not influencing the real-time processing.

The dot pattern 5a is combined on the background of the image of the document 700, for example, the background portion spreading through the whole image, or the peripheral blank area of the image. Therefore, in the process shown in FIG. 16, the embedding method identification information can be extracted without being influenced by the arrangement direction of the document 700. Even from this point of view, it is sufficient to use the line memory to extract the embedding method identification information. In addition, since extraction of the embedding method identification information is performed based on the image stored in the line memory, influence of this process on performance of the overall duplication process is small. Thus, the extraction of the embedding method identification information can be performed in the duplication process in real time.

Concerning a manager, consider that the manager may desire to be permitted to duplicate all kinds of documents regardless of whether the target embedding information is embedded by using non-real-time information embedding methods, the information extraction function of the image forming device 20 can be invalidated.

In the above embodiments, it is described that the document ID is embedded as the target embedding information. This is because usually it is difficult to embed document management information, such as a printer user, a printing device, and a printing date, within about 100 bits. However, depending on the environment, this matter can be considered from another point of view. For example, for a small-scale office, the number of documents under management is small, and information, like the printer user, the printing device, and the printing date, can be embedded directly in advance. In this case the printing date can be used for duplication control; for example, duplication is forbidden within three months from the printing date.

In the above embodiments, it is described that the plural non-real-time information embedding methods are different from each other. But it is possible to use only one information embedding method. In this case, the information embedded by the information embedding method may have a different structure, and the embedding method identification information as described above may be used to identify the structures.

For example, when error correction coding is performed on the embedding information, a parameter of strength of error correction ability in error correction coding can be selected from plural candidates. In this case, for example, information is different for different parameters of strength of error correction ability, and the different information corresponds to the different non-real-time information embedding methods.

Actually, when embedding dot patterns in a document image, information is not embedded in portions superposed with characters, drawings, pictures, and other contents. In addition, even when information is embedded in character shapes, because of mixing of noise during printing, usually, it is difficult to extract the embedded information at 100% precision. Even considering this matter, error correction coding of the embedded information is valid. Since the appropriate value of the strength of error correction depends on the contents of the document image, it is meaningful to make the strength of error correction allowable. In this case, for the parameter (in this embodiment, the information embedding method) there is only one choice. Hence, when extracting information, extraction of information of the error correction coding is performed depending on the value of the parameter.

Specifically, when using the (7, K) Reed-Solomon code for error correction, the value of K may be one selected beforehand from 1, 3, and 5. K is a parameter indicating how many symbols of a total of seven symbols including those for error correction are assigned to information symbols, as the symbols originally should be. When K=3, $(1-(3/7))$ of the total available capacity of embedding information when error correction is not performed is assigned to error correction. On the other hand, $(3/7)$ of the total available capacity of embedding information when error correction is not performed is assigned to information symbols, as the symbols originally should be.

As described above, in the present embodiment, when one or more of plural non-real-time information embedding methods are selected to embed information in an image (including a document image) on a medium, such as paper, identification information for identifying which method is used for embedding the information, namely, the embedding method identification information, is embedded in the image in real time and in such a manner that the identification information can be extracted. Due to this, when extracting the embedded information, it is possible to avoid unnecessary non-real-time information extraction, and prevent degradation of performance of information extraction processing.

Therefore, when a document ID is embedded as the embedding information, and duplication control (duplication permitted or not) is performed based on the document ID, it is possible to prevent degradation of performance of document ID extraction processing. Further, for documents not requiring duplication control, since it is determined through real-time information extraction that the document ID is not embedded, it is possible to avoid unnecessary non-real-time information extraction. Thus, it is not needed to stop usual duplication processes and to cause the user to wait, therefore preventing degradation of productivity of the usual duplication process.

While the present invention is described with reference to specific embodiments chosen for purpose of illustration, it should be apparent that the invention is not limited to these embodiments, but numerous modifications could be made thereto by those skilled in the art without departing from the basic concept and scope of the invention.

This patent application is based on Japanese Priority Patent Applications No. 2006-338559 filed on Dec. 15, 2006, and No. 2007-262266 filed on Oct. 5, 2007, the entire contents of which are hereby incorporated by reference.

What is claimed is:

1. An image processing device for embedding information into an image, comprising: a target information embedding unit configured to embed target information in the image by using one or more embedding methods selected from a plurality of information embedding methods; and an identification information embedding unit configured to embed identification information comprising dots in the image for identifying the selected one or more embedding methods used for embedding the target information, wherein the identification information embedding unit combines a dot pattern with an additional pattern obtained by rotating the dot pattern according to a value of the identification information on the image, and the identification information embedding unit embeds the target identification information in a method allowing an amount of the embedded information to be substantially the same as an amount of the embedded identification information in each of the selected one or more embedding methods.

2. The image processing device of claim 1, wherein the target information is processed with a non-real-time embedding method.

3. The image processing device of claim 1, wherein the identification information is processed with a real-time embedding method.

4. An image processing method for an image processing device to embed information in an image, the image processing method comprising: an information embedding step of embedding target information in the image by using one or more embedding methods selected from a plurality of information embedding methods; and an identification information embedding step of embedding identification information comprising dots in the image for identifying the selected one or more embedding methods used for embedding the target information, wherein in the identification information embedding step, a dot pattern is combined with an additional pattern obtained by rotating the dot pattern according to a value of the identification information on the image, and in the identification information embedding step, the identification information is embedded in a method allowing an amount of embedded target information to be substantially the same as an amount of embedded identification information in each of the selected one or more embedding methods.

5. The image processing device of claim 4, wherein the target information is processed with a non-real-time embedding method.

6. The image processing device of claim 4, wherein the identification information is processed with a real-time embedding method.

* * * * *